Figure 1:
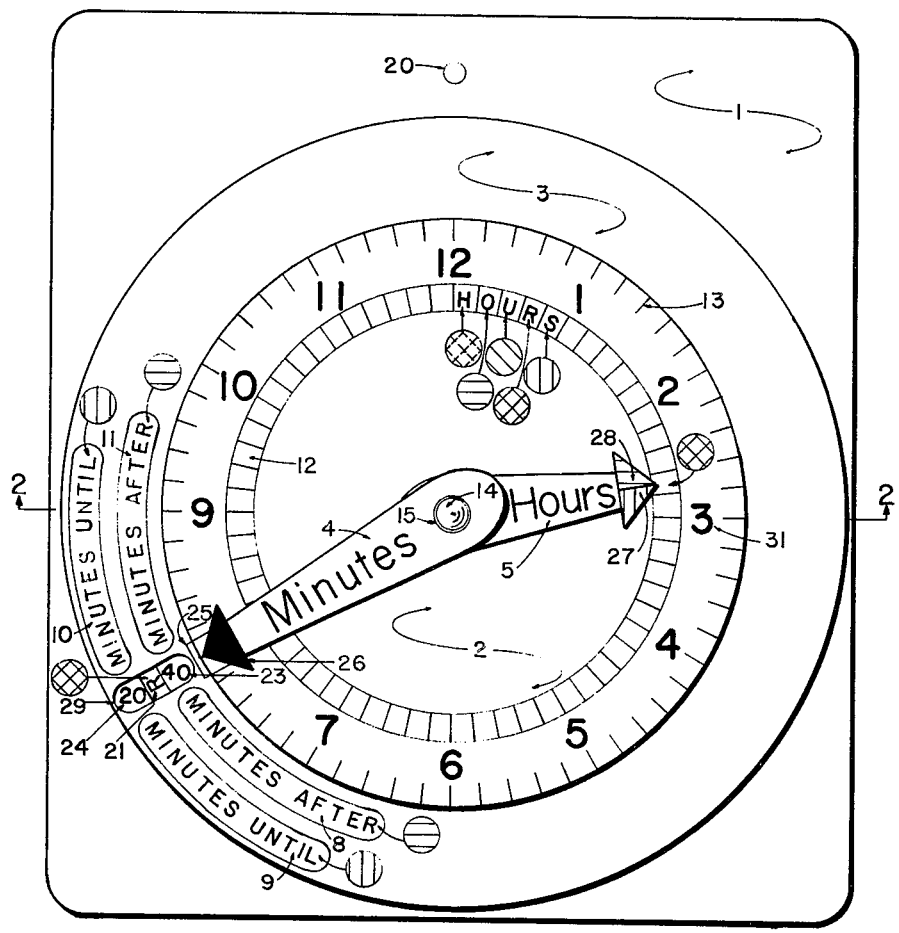

United States Patent [19]
Brooks

[11] 3,967,389
[45] July 6, 1976

[54] TIME TELLING TEACHING AID

[76] Inventor: Barry R. Brooks, 3945 Harvard Way, Livermore, Calif. 94550

[22] Filed: Mar. 24, 1975

[21] Appl. No.: 561,238

[52] U.S. Cl. .................................................. 35/39
[51] Int. Cl.² ........................................ G09B 19/12
[58] Field of Search ........................................ 35/39

[56] References Cited
UNITED STATES PATENTS

| | | | |
|---|---|---|---|
| 1,438,153 | 12/1922 | Whalen | 35/39 |
| 2,172,450 | 9/1939 | Pitcher | 35/39 |
| 3,022,582 | 2/1962 | Pitt | 35/39 |
| 3,131,489 | 5/1964 | Alpert | 35/39 |
| 3,149,423 | 9/1964 | Naples | 35/39 |
| 3,203,115 | 8/1965 | Friday | 35/39 |
| 3,670,428 | 6/1972 | Hall | 35/39 |
| 3,702,507 | 11/1972 | Romey | 35/39 |

FOREIGN PATENTS OR APPLICATIONS

| | | | |
|---|---|---|---|
| 17,281 | 1915 | United Kingdom | 35/39 |
| 797,859 | 7/1958 | United Kingdom | 35/39 |

*Primary Examiner*—William H. Grieb

[57] ABSTRACT

A teaching device to teach children time telling skills. The device comprises of a base, a rotatable peripheral ring with selector window, a top surface that represents the face of a clock, and a minute hand whose point is linked to the rotatable peripheral ring at the selector window and hour hand that individually rotate about a common pivot. The device uses a color and script coding ring and a separate color matching system for two distinct time telling functions as follows: (1) the minute color and script coding method enables the child to manipulate the minute and hour hands to match colors and script that will establish a realistic minute-hour hand relationship for any given time, and (2) the hour color matching system enables the child to decide whether minutes shown in the selector window are after the previous hour or before the succeeding hour. In addition the coding allows the child to choose the actual hour in question. The device is designed to stimulate the thinking of children with the use of decorative colors, recognizable script, and simple color matching while they are learning a relatively complicated subject.

5 Claims, 3 Drawing Figures

3,967,389

TIME TELLING TEACHING AID

| References Cited |  |  |  |
|---|---|---|---|
| United States Patents |  |  |  |
| 3,022,582 | 2/1962 | Pitt | 35/39 |
| 3,131,489 | 5/1964 | Alpert | 35/39 |
| 3,149,423 | 9/1964 | Naples | 35/39 |
| 3,203,115 | 8/1965 | Friday | 35/39 |
| 3,670,428 | 6/1972 | Hall | 35/39 |
| 3,702,507 | 11/1972 | Romey | 35/39 |

TIME TELLING TEACHING AID

This invention generally relates to educational teaching aids and more specifically to a time telling teaching aid developed to simplify the learning of time telling skills.

The objective of the invention is to provide a time telling teaching aid which is simple in construction, easy to use, well adapted for its intended purpose, and inexpensive to manufacture.

Another objective of the invention is to provide a time telling teaching aid where the child matches colors using the minute and hour hands to set up a realistic minute-hour hand relationship for any given time.

Another object of the invention is to provide a time telling teaching aid where the child matches recognizable script using the minute and hour hands to set up a realistic minute-hour hand relationship for any given time.

Still another objective of the invention is to provide a time telling teaching aid where the child matches a colored label on a rotatable peripheral ring with the same color at the point of the hour hand to determine preceding or succeeding hours.

Figure 2:
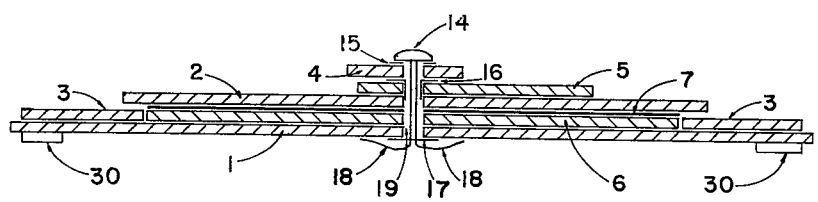
Figure 3:
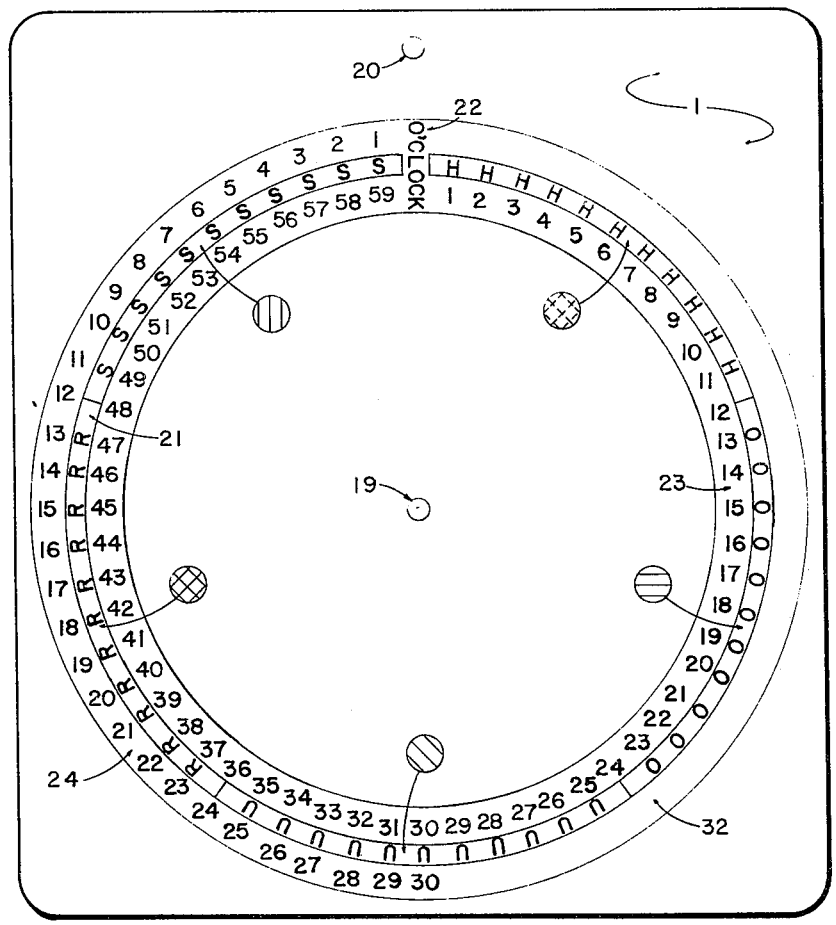

The foregoing and other objects and advantages which will become subsequently apparent reside in the details of construction and operation as more fully hereinafter described and claimed, reference being made to the accompanying drawings forming a part hereof, and which:

FIG. 1 is a plan view of the time telling teaching aid made in accordance with my invention, FIG. 2 is a cross sectional view of FIG. 1 taken along the line 2-2 of FIG. 1 showing the pivot hole, FIG. 3 is a plan view of the base having the same functions as that of the base in FIG. 1.

In carrying out the invention, referring now specifically to wherein like reference characters designate like parts, numeral 1 indicates generally a base plate made of cardboard, plastic or any other suitable material having the desired thickness. Referring specifically to FIG. 3 there is a pivot hole 19 about which the rotatable peripheral ring 3, minute hand 4, and hour hand 5 rotate.

The top surface 2 of the time telling teaching aid, FIG. 1, sometimes hereinafter referred to as the face of the clock or clockface, has inscribed, embossed, or printed thereon hour numerals 31 reading from 1 to 12 in a clockwise direction and arranged concentrically about pivot hole 19. Also arranged concentrically about pivot hole 19 and outboard from the clockface hour numerals 31 are minute indicia 13. Also arranged concentrically about pivot hole 19 and inboard of clockface numerals 31 is a clockface color and script coded minute ring 12. Said clockface color and script coded minute ring 12 is broken into 60 equal segments. Between any two clockface hour numerals 31 there are five such forementioned segments each of a different color and script in clockwise order as follows: Yellow-H, Red-O, Green-U, Orange-R, and Blue-S. As shown by FIG. 2, the clockface 2 is fastened securely to the base by adhesion, staples, or other similar methods with the addition of a circular spacer 7 and circular disc 6 between them about which the rotatable peripheral ring 3 rotates. The clockface 2, circular space 7, and circular disc 6 are made of cardboard, plastic, or any other suitable material having the desired thickness.

Referring now specifically to the base as shown by FIG. 3 and more specifically to the circular ring 32, said ring 32 is to be white or light in shade where printed indicia will be in contrast. The inner ring of numbers 23 represent minutes after the hour. Said numbers 23 are printed, embossed, or inscribed clockwise from 1 to 59. The outer ring of numbers 24 represent minutes until the hour. Said numbers 24 are printed, embossed, or inscribed counterclockwise from 1 to 30. Between the two forementioned rings of numbers there is a base color and script coded minute ring 21. Said base color and script coded minute ring 21 is made up of five equal segments with each segment a different color and script. Said colors and script are the same forementioned colors and script of the clockface color and script coded minute ring 12, and in the same color and script sequence as clockface color and script coded minute ring 12. Each color and script segment within the base color and script coded minute ring 21 corresponds to twelve minutes on the inner and outer numerical rings, 23 and 24 respectively. At top center of circular ring 32, the work "O'CLOCK" 22 is printed, embossed, or inscribed vertically to, and in the same vertical axis of, pivot hole 19 in such a manner as to be fully exposed by selector window 29 to be described in the following paragraph.

Referring again to FIG. 1 and more specifically to the rotatable peripheral ring 3, said ring 3 is made of cardboard, plastic, or any other suitable material having the desired thickness. Said ring 3 where visible to the user has a selector window 29 where 'minutes after' 23, 'minutes until' 24, and the base color and script coded minute ring are exposed. At the same radius about pivot hole 19 as that of the inner minute ring 23, labels 8 and 11 are located adjacent and normal to the selector window. Said labels have a red background with the words "MINUTES AFTER" printed, inscribed, or embossed upon them. Likewise, at the same radius about the pivot hole 19 as that of the outer minute ring 24, labels 9 and 10 are located adjacent and normal to the selector window. Said labels have a blue background with the words "MINUTES UNTIL" printed, inscribed, or embossed upon them. Using pivot hole 19 as a reference point the words on labels 10 and 11 to the right of the selector window 29 can be read by the child, whereas the words on labels 8 and 9 to the left of the selector window 29 are reversed 180° in such a manner as to be read by the child from the periphy looking towards pivot hole 19.

The minute hand 4 and hour hand 5 are made of cardboard, plastic, or any other suitable material of the desired thickness necessary to carry out their functions. On the minute hand 4 is printed, embossed, or inscribed the word "Minutes" and, likewise, on the hour hand 5 is printed, embossed, or inscribed the word "Hours". The minute hand 4 has a length such that the point is at the same radius as that of the peripheral edge of clockface 2, and likewise, the hour hand 5 has a length such that the point is at the same radius as that of the clockface color and script coded minute ring 12 on clockface 2. At the end of the minute hand 4 away from pivot hole 19 is a black triangle 26 whose point is linked to the rotatable peripheral ring 3 by transparent plastic or other suitable mateerial 25 and affixed to minute hand 4 and ring 3 by adhesion, staples, or another suitable means. At the end of the hour hand 5 away from the pivot hole 19 is a triangle that forms the point having the same size and shape as that of triangle 26 but made up of two equal sized colored triangles 27 and 28. Triangle 27 is of the same color as that of labels 9 and 10 and likewise, triangle 28 is of the same color as that of labels 8 and 11.

The minute hand 4 and hour hand 5 are allowed to rotate freely and individually about each other. Said hands are held about the pivot point 19 by a paper fastener 14, grommet washer 15, grommet 16, paper fastener washer 17, or suitable substitutes. The ends 18 of the paper fastener 14 are bent over in a manner to secure minute hand 4 and hour hand 5.

As a final point of description the following are considered by me to be additional requirements to complete my invention: the hole 20 of base 1 will allow the device to be hung on a wall or magnetic tape 30 will allow the device to be attached to metal appliances.

In general there are three different teaching techniques which will further describe my invention.

1. The most basic method used when children are learning colors, numbers, and script is to simply have the child rotate the rotatable peripheral ring 3 (minute hand 4) while finding colors, numbers, or script on the circular ring 32 through selector window 29. The child is then taught to rotate the hour hand 5 until the point of said hand points to a color or script within the clockface color and script coded minute ring 12 that matches that color or script shown through selector window 29 within the base color and symbol coded minute ring 21. The child has then set the proper minute-hour hand relationship.

2. As the child develops and is at the point where each item and its function of the clockface 2 can be located and identified, viz, which hand is the minute hand and which hand is the hour hand, the child can again be told to rotate the rotatable peripheral ring 3 as in technique (1) and again by matching colors and script with the hour hand 5 as in technique (1) the child can establish a realistic minute-hour hand relationship. The child can at this point read the time as shown in FIG. 1 as follows: forty minutes after two. The necessity of a hour color and script coding system becomes apparent because the child does not know whether minutes after, as shown by FIG. 1, are after two or after three. By reading "minutes after" as found on labels 8 and 11 and because labels 8 and 11 are red, the child need only to select the hour numeral 31 two which is adjacent the red triangle 28 at the point of the hour hand 5. Likewise the time as shown in FIG. 1 can also be read twenty minutes until three and by employing the forementioned system reasoning, the blue labels 9 and 10 will match triangle 27 to determine hour numeral 31 three.

3. As an alternative to technique (2) the more advanced child or children can simply be given a time and then be allowed to set his/their time telling teaching aid to that given time using techniques (1) and (2) to achieve the proper answer.

The foregoing is considered as illustrative only of the principles of my invention. It is not my intent to limit my invention to those specfic colors and script used in the coding, the number of segments used, or the illustrative teaching techniques used for demonstration. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

Having thus completely and fully described the invention what is now claimed as new is as follows:

1. A time telling teaching aid comprising of,
   a. a clockface with standard concentric clock indicia of minute segments and hour numerals with the addition of a concentric color and script coded minute ring made up of sixty equal segments, where five consecutive segments complete a sequence of different colors and script between any two hour numerals,
   b. a base with minute numerals applied clockwise 1 to 59 at 6 ° intervals, minute numerals applied counterclockwise 1 to 30 at 6° intervals, a base color and script coded minute ring between said clockwise and counterclockwise minute numerals made up of five equal segments of the same five different sequenced colors and script as found within the forementioned clockface color and script coded minute ring between any two hour numerals, with said base indicia concentric about a pivot hole at a radius greater than that of the peripheral edge of the clockface and with the word "O'CLOCK" applied vertical to, and in the same vertical axes of, said pivot hole at the same radius as the forementioned base indicia,
   c. a rotatable peripheral ring that covers the indicia of paragraph (b) which has an oblong selector window where said window exposes the forementioned clockwise and counterclockwise minute indicia, the base color and script coded minute ring, and the word "O'CLOCK" at top center at one minute intervals, and where said window has two labels of the same color on each side of the selector window at the same radius as the base clockwise minute numbers with each label having the words "MINUTES AFTER" applied to it and two labels of the same color, but different from the color of the forementioned labels, on each side of the selector window at the same radius as the counterclockwise numbers with each label having the words "MINUTES UNTIL" applied to it, and of the four said labels, the two labels to the right of the selector window, viewing them from the pivot hole towards the periphery, are right-side-up whereas the two labels to the left of the selector window, with the same forementioned orientation, are upside-down,
   d. a circular spacer of a lesser diameter than the clockface between the clockface and base to allow the securing of said clockface to said base and the free movement of the rotatable peripheral ring around said circular spacer between said clockface and base, e. a minute hand with the word "MINUTES" applied to it with an equilateral triangle forming the point, and f. an hour hand with the word "HOURS" applied to it with an equilateral triangle forming the point such that the tip of said point lies within the clockface color and script coded minute ring, with said triangle made up of two equal sized colored triangles each of a different color such that the color of the triangle adjacent to any previous hour numeral is the same as that of the "MINUTE AFTER" label of paragraph (c) and the color of the triangle adjacent to any succeeding hour numeral is the same as that of the "MINUTE UNTIL" label of paragraph (c), and with said hour hand manipulated separately from the minute hand about the forementioned pivot hole.

2. The device of claim 1 where the segmented concentric coded minute ring on the clockface and base are made up of colors only.

3. The device of claim 1 where the segmented concentric coded minute ring on the clockface and base are made up of script only.

4. The device of claim 1 where the number of segments within the concentric coded minute ring on the clockface is divisible by twelve and where the number of segments within the concentric base coded minute ring is the quotient of the forementioned division.

5. The device of claim 1 wherein the point of the minute hand is linked to the rotatable peripheral ring at the oblong window so as to turn together.

* * * * *